United States Patent [19]
Bottomley

[11] Patent Number: 5,680,419
[45] Date of Patent: Oct. 21, 1997

[54] METHOD OF AND APPARATUS FOR INTERFERENCE REJECTION COMBINING IN MULTI-ANTENNA DIGITAL CELLULAR COMMUNICATIONS SYSTEMS

[75] Inventor: Gregory E. Bottomley, Cary, N.C.

[73] Assignee: Ericsson Inc., Research Triangle Park, N.C.

[21] Appl. No.: 284,775

[22] Filed: Aug. 2, 1994

[51] Int. Cl.$^6$ .............................. H04B 7/10; H04L 1/02
[52] U.S. Cl. ............................................ 375/347; 455/132
[58] Field of Search .................................. 375/262, 265, 375/267, 341, 346, 347, 348, 349, 229, 230, 232, 235, 343, 316, 259; 455/132, 133; 329/304

[56] References Cited

U.S. PATENT DOCUMENTS

| | | | |
|---|---|---|---|
| 4,644,562 | 2/1987 | Kavehrad et al. | 375/14 |
| 4,713,817 | 12/1987 | Wei | 371/262 X |
| 4,992,798 | 2/1991 | Nozue et al. | 342/362 |
| 5,031,193 | 7/1991 | Atkinson et al. | 375/231 |
| 5,048,059 | 9/1991 | Dent | 375/94 |
| 5,155,744 | 10/1992 | Ringelhaan | 375/94 |
| 5,164,961 | 11/1992 | Gudmundson | 375/11 |
| 5,191,598 | 3/1993 | Backstrom et al. | 375/100 |
| 5,319,677 | 6/1994 | Kim | 375/100 |
| 5,351,274 | 9/1994 | Chennakeshu et al. | 375/100 |
| 5,440,590 | 8/1995 | Birchler et al. | 375/347 |
| 5,481,572 | 1/1996 | Skold et al. | 375/347 |
| 5,530,725 | 6/1996 | Koch | 375/347 |

FOREIGN PATENT DOCUMENTS

543328A1  11/1992  European Pat. Off. ........ H04B 7/00

OTHER PUBLICATIONS

P. Vila, F. Pipon, D. Pirez, and L. Fóty, "MLSE antenna diversity equalization of a jammed frequency–selective fading channel," *Proc. EUSIPCO '94*, Edinburgh, UK, Sep. 1994, pp. 1516–1518.

M. Stojanovic, J. Catipovic, and J.G. Proakis, "Adaptive multichanneö combining and equalization for underwater acoustic communications," *J. Acoust. Soc. Am.*, vol. 94, pp. 1621–1631, Sep. 1993.

J. W. Modestino and V.M. Eyuboglu, "Integrated multielement receiver structures for spatially distributed interference channels," *IEEE Trans. on Info. Theory*, vol. IT-32, pp. 195–219, Mar. 1986.

N.W.K. Lo, D.D. Falconer and A.U.H. Skeikh, "Adaptive Equalization and Diversity Combining for a Mobile Radio Channel," *Proc. IEEE Globecom '90*, pp. 507A.1.1–507A.2.5, Dec. 1990.

N.W.K. Lo, D.D. Falconer and A.U.H. Skeikh, "Adaptive Equalization and Diversity Combining for Mobile Radio Using Interpolated Channel Estimates," *IEEE Trans. Veh. Technol.*, vol. 40, pp. 636–645, Aug. 1991.

(List continued on next page.)

*Primary Examiner*—Tesfaldet Bocure
*Assistant Examiner*—Bryan Webster
*Attorney, Agent, or Firm*—Eric L. Stasik

[57] ABSTRACT

A digital radio communications system is presented in which the deleterious effects of fading, time dispersion and interference found in the channel are mitigated by using interference rejection and diversity combining. Digital signals representative of digital symbol sequences are transmitted through a radio channel in which the signals may be corrupted by fading, time dispersion and interference. The corrupted signals are received by a receiver having one or more antennas. The received signals are processed to form a received signal sample stream $r_d(kT_s)$ for each of the antennas. Estimated received signal samples for each of the antennas are produced by combining hypothesized signal sequences and models of each channel. The received signal samples and the estimated received signal samples are processed in conjunction with an estimate of the impairment correlation properties to produce branch metrics to be used by a Viterbi, or other sequence estimation, algorithm. The branch metric processor may assume one of several configurations depending on whether or not the channel is time-varying.

25 Claims, 8 Drawing Sheets

OTHER PUBLICATIONS

R.D. Koilpillai, S. Chennakeshu, and R.L. Toy, "Equalizer Performance With Diversity for U.S. Digital Cellular," *Intl. Symp. on Personal, Indoor and Mobile Radio Commun.*, Boston, MA, pp. 255–259, Oct. 19–21, 1992.

J.H. Winters, "Signal acquisition and tracking with adaptive arrays in the digital mobile radio system IS–54 with flat fading," *IEEE Trans. Veh. Technol.*, vol. 42, pp. 377–384, Nov. 1993.

A.P. Clark and S. Hariharan, "Adaptive channel estimator for an HF radio link," *IEEE Trans. Commun.*, vol. 37, pp. 918–926, Sep. 1989.

G.D'Aria, R. Piermarini and V. Zingarelli, "Fast adaptive equalizers for narrow–band TDMA mobile radio," *IEEE Trans. Veh. Technol.*, vol. 40, pp. 392–404, May 1991.

Forney, "The Viterbi Algorithm," *Proc. IEEE*, vol. 61, pp. 286–296, Mar. 1973.

J.H. Winters, "Optimum Combining in Digital Mobile Radio with Cochannel Interference," *IEEE J. Sel. Areas Commun.*, vol. SAC–2, pp. 528–539, Jul. 1984.

J.H. Winters, "Optimum Combining in Digital Mobile Radio with Cochannel Interference," *Trans. Veh. Techol.*, vol. VT–33, pp. 144–155, Aug. 1984.

J.H. Winters, "On the Capacity of Radio Communication Systems with Diversity in a Rayleigh Fading Environment," *IEEE J. Sel. Areas Commun.*, vol. SAC–5, pp. 871–878, Jun. 1987.

J.H. Winters, "Optimum Combining for Indoor Radio Systems with Multiple Users," *IEEE Trans. Commun.*, vol. COM–35, pp. 1222–1230, Nov. 1987.

P. Balaban and J. Salz, "Dual Diversity Combining and Equalization in Digital Cellular Mobile Radio," *IEEE Trans. Veh. Technol.*, vol. 40, pp. 342–354, May 1991.

S.A. Hanna, M. El–Tanany, and S.A. Mahmoud, "An Adaptive Combiner for Co–Channel Interference Reduction in Multi–User Indoor Radio Systems," *Proc. IEEE Veh. Technol. Conf.*, St. Louis, MO, May 19–22, 1991, pp. 222–227.

J.H. Winters, J. Salz, and R.D. Gitlin, "The Capacity Increase of Wireless Communication Systems with Antenna Diversity," *Proc. 1992 Conf. Inform. Sciences Syst.*, vol. II, Princeton, NJ, Mar. 18–20, 1992, pp. 853–858.

P. Balaban and J. Salz, "Optimum Diversity Combining and Equalization in Digital Data Transmission with Applications to Cellular Mobile Radio—Part I: Theoretical Considerations," *IEEE Trans. Commun.*, vol. 40, pp. 885–894.

J.H. Winters, J. Salz, and R.D. Gitlin, "The Capacity of Wireless Communication Systems Can Be Substantially Increased by the Use of Antenna Diversity," *1st Intl. Conf. on Universal Personal Communications (ICUPC '92)*, Sep. 29–Oct. 2, 1992, Dallas, TX, pp. 02.01.1–02.01.5.

M.V. Clark, L.J. Greenstein, W.K. Kennedy, and M. Shafi, "Optimum Linear Diversity Receivers in Digital Cellular Radio," *Proc. Third International Symposium on Personal, Indoor, and Mobile Radio Communications*, Boston, MA, Oct. 19–21, 1992.

J.H. Winters, "Signal Acquisition and Tracking with Adaptive Arrays in Wireless Systems," *Proc. 43rd IEEE Veh. Technol. Conf.*, Secaucus, NJ 1993, pp. 85–88.

J.H. Winters, J. Salz, and R.D. Gitlin, "The Impact of Antenna Diversity on the Capacity of Wireless Communication Systems," *IEEE Trans. Commun.*, vol. 42, pp. 1740–1751, Feb./Mar./Apr. 1994.

D.W. Tufts and A.A. Shah, "Rapid Interference Suppression and Channel Identification for Digital, Multipath Wireless Channels," *Proc. 44th IEEE Veh. Technol. Conf.*, Stockholm, Sweden, Jun. 7–10, 1994, pp. 1241–1245.

S. Simanapalli, "Adaptive Array Methods for Mobile Communication," *Proc. 44th IEEE Veh. Technol. Conf.*, Stockholm, Sweden, Jun. 7–10, 1994, pp. 1503–1506.

W.–H. Sheen and G.L. Stuber, "MLSE Equalization and Decoding for Multipath–Fading Channels," *IEEE Trans. Commun.*, vol. 39, No. 10, Oct. 91.

Q. Liu and Y. Wan, "An Adaptive Maximum–likelihood Sequence Estimation Receiver With Dual Diversity Combining/Selection," *Int. Symp. on Personal, Indoor and Mobile Radio Commun.*, Boston, MA, pp. 245–249, Oct. 19–21, 1992.

Q. Liu and Y. Wan, "A Unified MLSE Detection Technique for TDMA Digital Cellular Radio," *43rd IEEE Vehicular Technology Conference*, Secaucus, NJ, pp. 265–268, May 18–20, 1993.

P. Monsen, "Theoretical and Measured Performance of a DFE Modem on a Fading Multipath Channel," *IEEE Trans. Commun.*, vol. COM–25, pp. 1144–1153, Oct. 1977.

P. Monsen, "Feedback Equalization for Fading Dispersive Channels," *IEEE Trans. Info. Theory*, vol. IT–17, pp. 56–64, Jan. 1981.

P. Monsen, "MMSE Equalization of Interference on Fading Diversity Channels," *IEEE Trans. Commun.*, vol. COM–32, No. 1, pp. 5–12, Jan. 1984.

G. Ungerboeck, "Adaptive Maximum–Likelihood Receiver for Carrier–Modulated Data–Transmission Systems," *IEEE Trans. Commun.*, vol. COM–22, pp. 624–635, May 1974.

W. Van Etten, "Maximum Likelihood Receiver for Multiple Channel Transmission Systems," *IEEE Commun.*, vol. COM–24, pp. 276–283, Feb. 1976.

METHOD OF AND APPARATUS FOR INTERFERENCE REJECTION COMBINING IN MULTI-ANTENNA DIGITAL CELLULAR COMMUNICATIONS SYSTEMS

RELATED APPLICATIONS

This application is related to U.S. patent application Ser. No. 08/241,761 U.S. Pat. No. 5,481,572 (attorney docket number E8699) entitled "Method of and Apparatus for Reducing the Complexity of a Diversity Combining and Sequence Estimation Receiver", by Johan Sköld and Per-Olof Eriksson, and filed concurrently herewith. This related application is also assigned to the same assignee as the present application and is incorporated herein by reference in its entirety.

FIELD OF THE INVENTION

The present invention relates generally to the demodulation of digitally modulated radio signals received by a plurality of antennas and more specifically to the diversity combining of radio signals subjected to multipath fading, time-dispersion and interference.

BACKGROUND OF THE INVENTION

A common problem that occurs in the radio transmission of signals is that the signals are sometimes lost as a result of multipath fading and interference which may exist in a radio transmission channel. Throughout the following, the terms radio transmission channel, radio channel, and channel are used equivalently to refer to the same item. There are basically two multipath effects: flat fading and time dispersion. Flat fading arises from the interaction of the transmitted signal, or main ray, and reflections thereof, or echoes, which arrive at the receiver at approximately the same time. If there are a large number of reflections, flat fading gives rise to a Rayleigh distribution. Time dispersion occurs when the echoes are delayed with respect to the main ray. There may also exist in the radio environment signal sources which are not orthogonal to the desired signal. Non-orthogonal signals, or interference, often come from radios operating on the same frequency (i.e., co-channel interference) or from radios operating on neighboring frequency bands (i.e., adjacent-channel interference); non-orthogonal signal sources are referred to as interferers.

One known method of reducing the influence of Rayleigh fading is to use a receiver having two or more mutually separated antennas, for instance as described in *Mobile Communications Design Fundamentals* by William C. Y. Lee, Howard W. Sams & Co., Indiana, USA. In section 3.5.1 of this book several examples are given describing how signals from two receiver amplifiers with separate antennas can be combined to counteract fading. These techniques are generally referred to as diversity combining.

Time dispersion may be advantageously corrected by using an equalizer. In the case of digital signal modulation, a maximum likelihood sequence estimation (MLSE) equalizer such as described in *Digital Communications*, $2^{nd}$ Ed., by John G. Proakis, Mc-Graw Hill Book Company, New York, New York, USA, 1989 may be used. In section 6.7 of this book, various methods are described for detecting signals corrupted by time dispersion, or inter-symbol interference (ISI), using MLSE equalization.

The impact of other signal interference may be reduced by employing array processing techniques with multiple antennas. For example, adaptive beamforming can be used to "steer" a null in the antenna pattern in the direction of an interferer.

Recently, methods have been proposed that partially, solve the problems of multipath fading and interference. In U.S. Pat. No. 5,191,598 to Bäckström, et al., for example, the problem of accurately detecting signals in the presence of flat fading and time dispersion is overcome by using a Viterbi-algorithm having a transmission function estimated for each antenna. By reference thereto, U.S. Pat. No. 5,191, 598 is incorporated herein in its entirety by reference.

A method of accurately detecting signals in the presence of flat fading and interference was presented in the *IEEE Transactions on Vehicular Technology*, Vol. 42, No. 4, Nov. 1993, J. H. Winters: "Signal Acquisition and Tracking with Adaptive Arrays in the Digital Mobile Radio System IS-54 with Flat Fading".

In a practical radio communication system, there commonly co-exists flat fading, time dispersion, and interference. While the above-mentioned techniques address some of these problems, there exists a need to simultaneously and jointly combat flat fading, time dispersion, and interference.

SUMMARY OF THE INVENTION

In view of the foregoing background, it is therefore an object of the present invention to jointly combat and correct for the simultaneous existence of flat fading, time dispersion, and interference.

A method is presented for generating and transmitting a signal representing a transmitted symbol sequence and receiving the signal on one or more antennas. The signal is processed to produce received signal samples for each of the antennas. Channel taps are estimated for each of the antennas. Impairment correlation properties are also estimated. Branch metrics are formed in a branch metric processor using the received signal samples and the channel tap and impairment correlation estimates. The branch metrics are employed in a sequence estimation algorithm to estimate the transmitted symbol sequence.

In one embodiment, branch metrics are formed by generating hypothetical symbol sequences and filtering the hypothetical signal sequences with the channel tap estimates to produce hypothesized received signal samples for each antenna. The hypothesized received signal samples are subtracted from the received signal samples to produce hypothesized error signals which are processed with the estimate of impairment correlation properties to produce branch metrics.

In another embodiment, an estimate of impairment correlation properties is formed by generating tentative detected symbol sequences which are filtered with the channel tap estimates to produce detected signal samples for each antenna. The detected signal samples are subtracted from the received signal samples to produce detected error signals which are processed with the estimate of impairment correlation properties to produce an update of the estimate of the impairment correlation properties.

In still another embodiment, branch metrics are performed by generating hypothetical symbol sequences and calculating pre-computed values for all of the hypothetical symbol sequences using the channel tap estimates and the estimates of impairment correlation properties. The pre-computed values are processed with the received signal samples to produce branch metrics.

In yet a further embodiment branch metrics are formed by generating hypothetical symbol sequences and combining the received signal samples with the channel tap estimates and the estimate of impairment correlation properties to produce metric multipliers which are processed with the hypothetical symbol sequences to produce branch metrics.

An apparatus is also presented comprising a digital transmitter for generating and transmitting a signal representing a transmitted symbol sequence, a receiver for receiving said signal on one or more antennas, an analog to digital converter for converting the signal into received signal samples for each of the antennas, a channel tap estimator for estimating channel taps for each of the antennas to produce channel tap estimates, an impairment correlation estimator for estimating impairment correlation properties to produce an estimate of impairment correlation properties. The apparatus also comprises a branch metric processor coupled to the channel tap estimators, the impairment correlation estimator and the received signal samples for forming branch metrics using the received signal samples, the channel tap estimates, and the estimate of impairment correlation properties. The output of the branch metric processor is coupled to a sequence estimation processor which produces an estimate of said transmitted symbol sequence.

In another embodiment the branch metric processor comprises a symbol sequence generator for generating hypothetical symbol sequences coupled to a digital filter for filtering the hypothetical signal sequences with the channel tap estimates to produce hypothesized received signal samples for each antenna. The filters are coupled to means for subtracting said hypothesized received signal samples from the received signal samples to produce hypothesized error signals which are coupled to means for processing said hypothesized error signals with said estimate of impairment correlation properties to produce branch metrics.

Yet another embodiment is presented in which the impairment correlation estimator comprises a symbol sequence generator for generating tentative detected symbol sequences coupled to a digital filter for filtering the tentative detected symbol sequences with the channel tap estimates to produce detected signal samples for each antenna. The filter outputs are coupled to means for subtracting said detected signal samples from the received signal samples to produce detected error signals which are coupled to means for processing said detected error signals with said estimate of impairment correlation properties to produce an update of the estimate of impairment correlation properties.

These and other features and advantages of the present invention will be readily apparent to one of ordinary skill in the art from the following written description when read in conjunction with the drawings in which like reference numerals refer to like elements.

DESCRIPTION OF THE INVENTION

In the following description, for purposes of explanation and not limitation, specific details are set forth, such as particular circuits, circuit components, techniques, etc. in order to provide a thorough understanding of the invention. However it will be apparent to one of ordinary skill in the art that the present invention may be practiced in other embodiments that depart from these specific details. In other instances, detailed descriptions of well-known methods, devices, and circuits are omitted so as not to obscure the description of the present invention with unnecessary detail.

Figure 1:
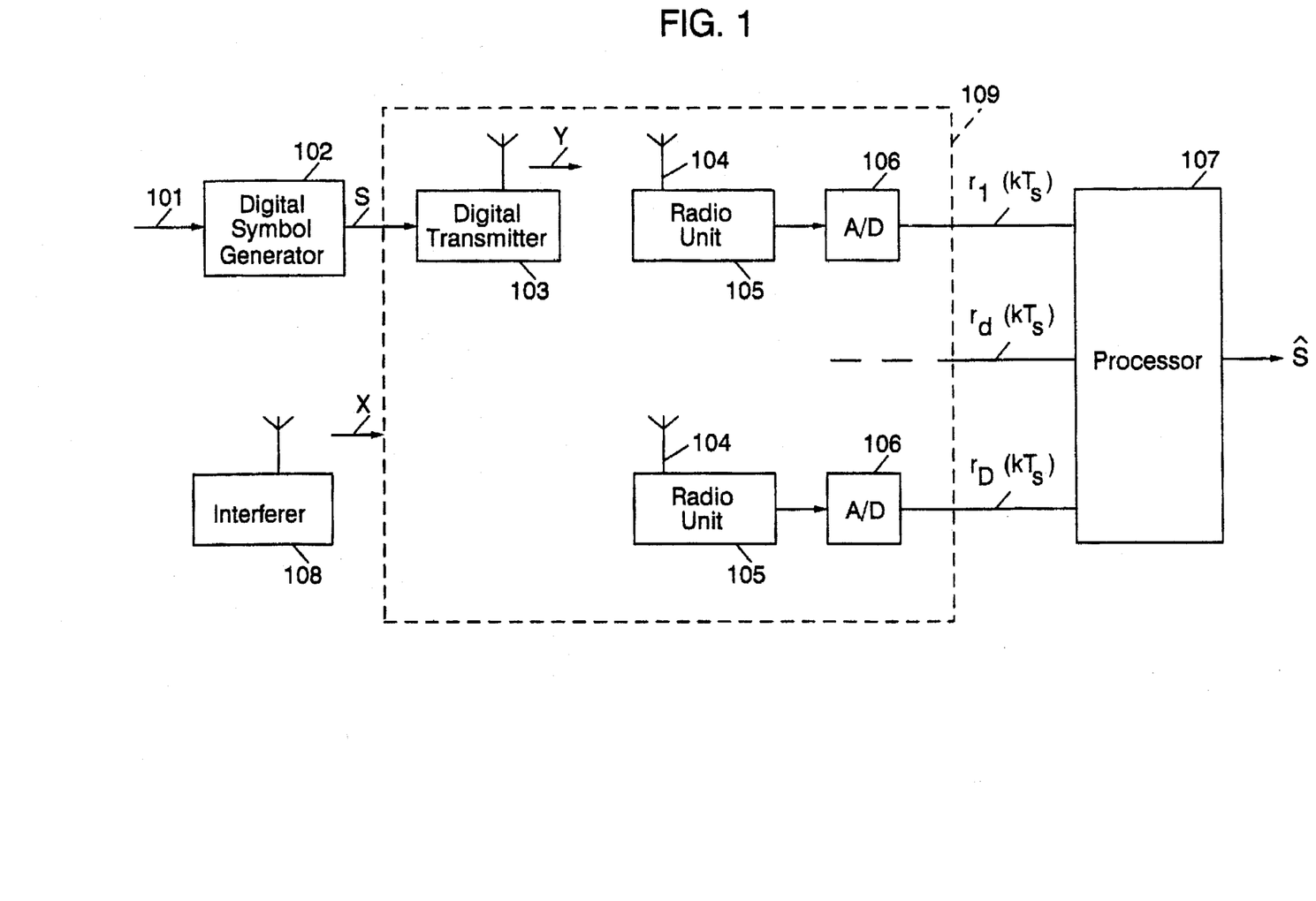
FIG. 1 is a schematic illustration of a digital radio communication system.

A radio transmitter and receiver system for a radio communication system is illustrated schematically in FIG. 1. The radio communication system may operate using frequency division multiple access (FDMA), time division multiple access (TDMA), or code division multiple access (CDMA), or some combination thereof. A transmitter has a digital symbol generator 102 which receives an information carrying signal 101 and generates a corresponding digital symbol sequence, S. The symbols S are subjected to digital to analog (D/A) conversion, modulation, pulse shape filtering, amplification, and are transmitted as analog signal Y by digital transmitter 103 according to known techniques.

In addition to thermal noise, there may also exist an interferer 108 transmitting signal X which may be non-orthogonal to signal Y. Signals Y and X travel through separate radio channels and are intercepted by antennas 104 which are D in number.

Radio units 105 amplify, downconvert, and filter the received signals according to known methods to produce analog signals. Each analog signal is coupled to an analog-to-digital (A/D) converter 106, which converts the analog signal into a received signal sample stream $r_d(kT_s)$, where $T_s$ is the sample period, the reference numeral k is an integer counter, and the subscript d indicates that the signal arrives from the $d^{th}$ antenna $1 \leq d \leq D$. The sampling period $T_s$ may be less than the symbol period T. The received signal sample streams are collected in processor 107, which processes these streams to produce an estimate of the transmitted digital symbol stream, Ŝ. In later descriptions, transmission function 109 is used to refer to the signal path through digital transmitter 103, the radio transmission channel (not shown in FIG. 1), antennas 104, radio units 105 and A/Ds 106 collectively.

Figure 2:
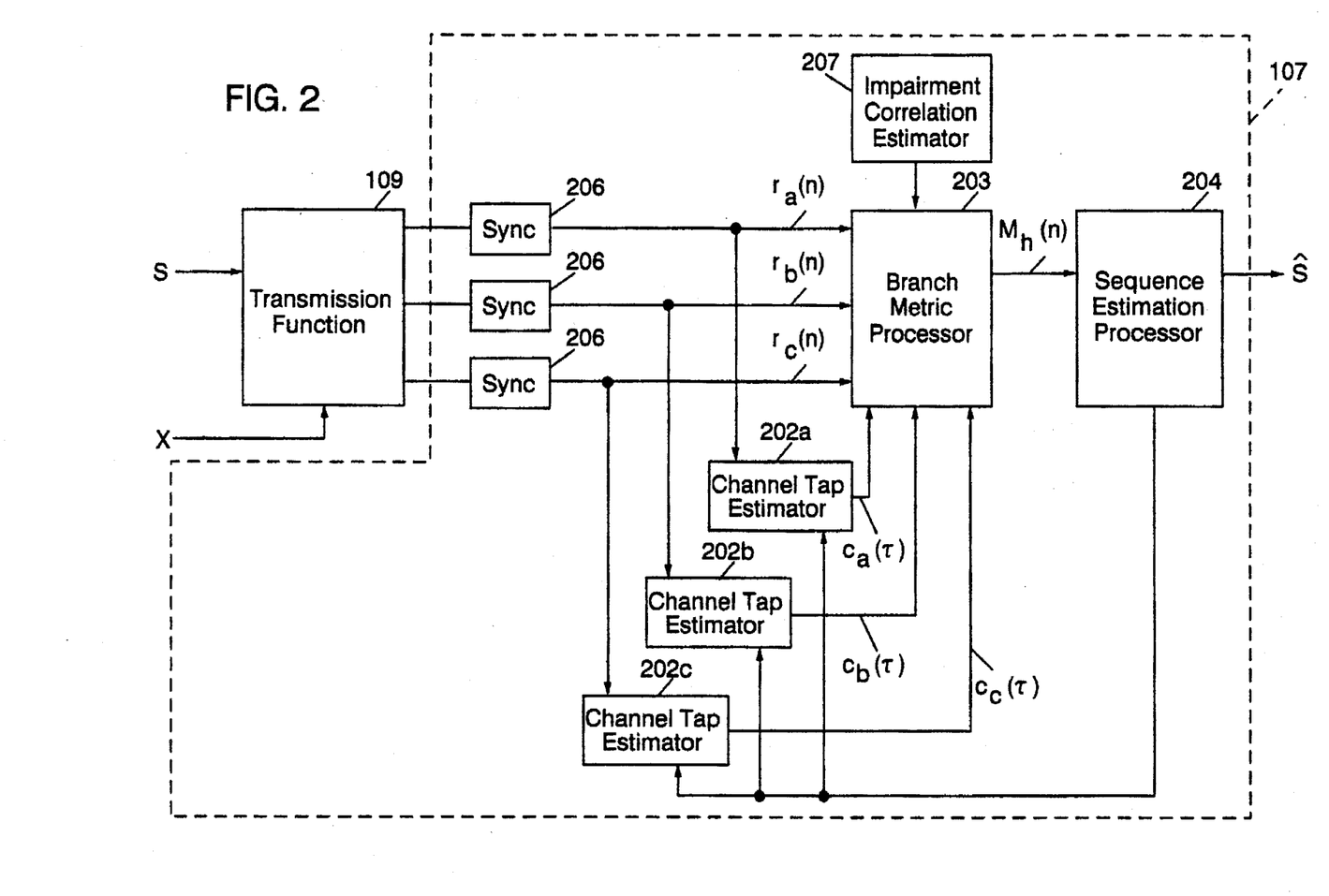
FIG. 2 is a schematic illustration of a receiver processor and transmission function according to the present invention.

The processing unit 107 is illustrated in greater detail in FIG. 2 where, for simplicity, the number D of antennas is restricted to three: designated a, b, and c. Processing unit 107 may be, for example, a Digital Signal Processor (DSP) such as a TMS320C50 manufactured by Texas Instruments. The function of processing unit 107 is to produce an estimate of the transmitted digital symbol stream Ŝ which accurately corresponds to the symbol sequence S which was originally transmitted.

Transmission function 109 produces the received signal sample streams $r_a(kT_s)$, $r_b(kT_s)$, and $r_c(kT_s)$ which are sent to processing unit 107 where they are processed in accordance with the present invention. The received signal sample streams $r_a(kT_s)$, $r_b(kT_s)$, and $r_c(kT_s)$ are coupled to a signal pre-processor, or sync, block 206 where the received signal sample streams are correlated with known timing/synchronization sequences as described, for example, by Giovanna, et al. "Fast Adaptive Equalizers for Narrow-Band TDMA Mobile Radio", *IEEE Transactions on Vehicular Technology*, Vol. 40, No. 2, May 1991, pp. 392–404. For the case of symbol-spaced demodulation, if the sample period $T_s$ is less than symbol period, T, the signal pre-processor 206 performs a decimation of the received signal sample streams $r_a(kT_s)$, $r_b(kT_s)$, and $r_c(kT_s)$ to produce one sample per symbol: designated $r_a(n)$, $r_b(n)$, and $r_c(n)$ respectively. For the case of fractionally-spaced demodulation, more than one sample per symbol is generated.

Estimating circuits 202a, 202c, and 202c produce channel tap estimates $c_a(\tau)$, $c_b(\tau)$, and $c_c(\tau)$ which are used to model the radio transmission channel associated with each particular antenna. Initial channel tap estimates can be obtained from sync correlation values or least-squares estimation according to known techniques. If the channel must be tracked, it is typical to use received data and tentative symbol estimate values generated in the sequence estimation processor 204. Channel tracking is known to those skilled in the art as discussed, for example, in *Digital Communications 2nd Ed.* by Proakis as previously mentioned, and by A. P. Clark and S. Hariharan, "Adaptive Channel Estimates for an HF Radio Link", *IEEE Trans. on Communications*, vol. 37, pp. 918–926, September 1989. The channel tap estimates $c_a(\tau)$, $c_b(\tau)$, and $c_c(\tau)$ are coupled to the input of the branch metric processor 203.

Also coupled to the branch metric processor 203 is an estimate of the impairment correlation properties obtained from impairment correlation estimator 207. The estimate of the impairment correlation properties comprises information regarding the impairment correlation properties between the antennas 104, or between relative sample phases as will be discussed in greater detail hereinafter. The impairment correlation estimator uses impairment process estimates to update and possibly track the estimate of the impairment correlation properties which is discussed in further detail in the ensuing text and figures.

Branch metric processor 203 uses received signal samples $r_a(n)$, $r_b(n)$, and $r_c(n)$, channel tap estimates $c_a(\tau)$, $c_b(\tau)$, and $c_c(\tau)$, and the estimate of the impairment correlation properties to form branch metric $M_h(n)$. This branch metric is used, for example, in a sequence estimation processor 204 to develop tentative and final estimates of the transmitted symbols.

It will be appreciated by one of ordinary skill in the art how the present invention operates when fractionally-spaced (T/M) equalization is employed. In this case, each signal preprocessor 206 produces M samples per symbol period, which correpond to M different sampling phases. This gives rise to M received signal sample streams per antenna. As a result, branch metric processor 203 receives D times M sample streams. As before, the channel tap estimators 202a–202c produce channel tap estimates for antennas a–c respectively. However, these channel tap estimates are more in number, as estimates for each sampling phase must be provided. Also, the impairment correlation estimator 207 estimates impairment correlation properties over antennas and sampling phases. This is done by treating the D antennas and M sampling phases as D times M antennas. As a result, the branch metric processor operates in a manner equivalent to having D times M antennas and one sample per symbol. It is apparent that the present invention can be applied to the case of one receive antenna and fractionally-spaced equalization.

Figure 3:
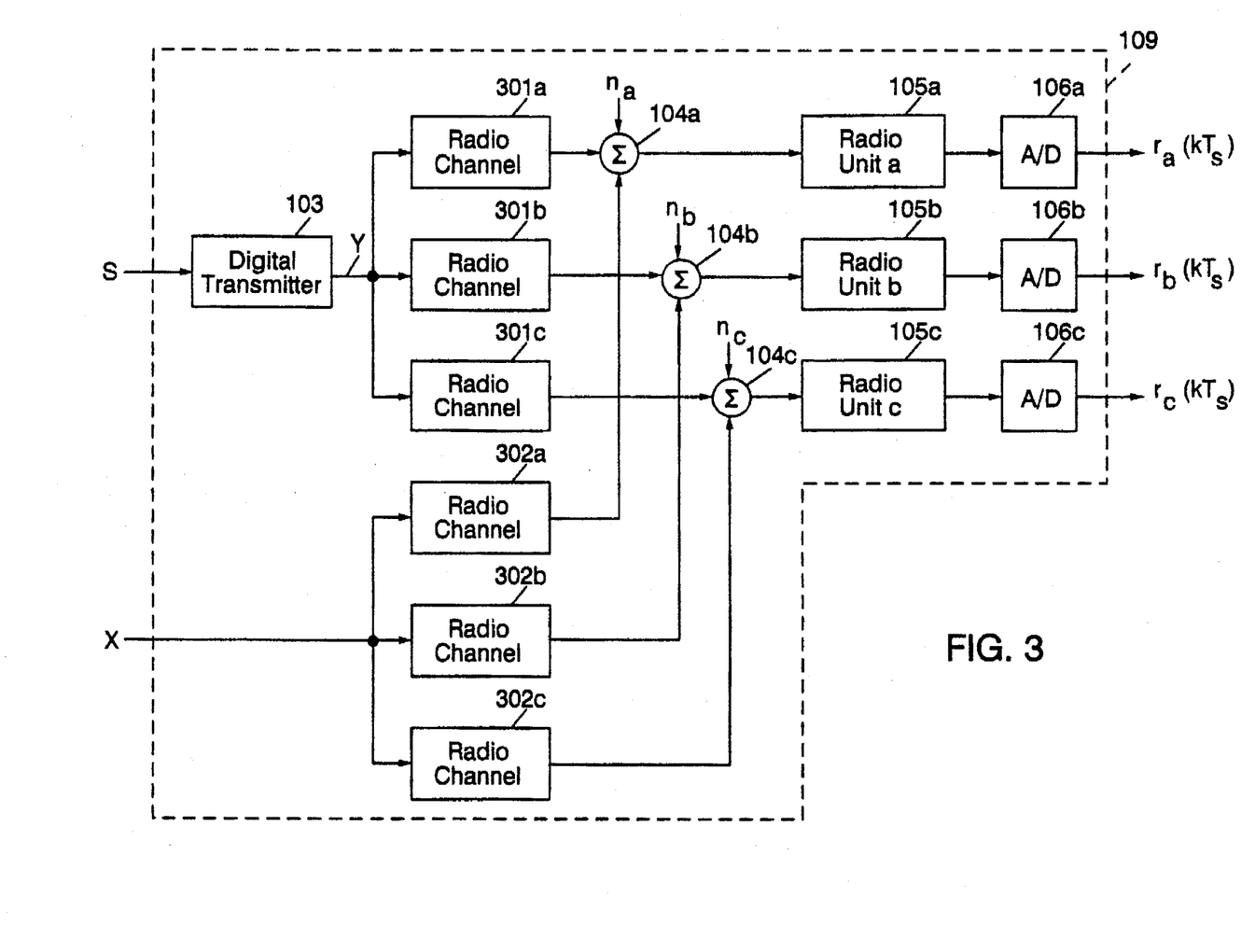
FIG. 3 is a schematic illustration of a transmission function.

The transmission function 109 is illustrated in greater detail in FIG. 3 where, for simplicity, the number of interferers is restricted to one. It is obvious to one skilled in the art that the present invention may also be used for the case where there are two or more interferers. The transmit function 109 begins with the signal path for the symbol sequence S through digital transmitter 103 which transmits analog signal Y. The analog signal Y propagates through a separate radio transmission channel to each of the three receiver antennas: radio channel 301a to receiver antenna 104a, radio channel 301b to receiver antenna 104b, and radio channel 301c to receiver antenna 104c. Similarly, interference signal X also propagates through three other separate radio channels 302a–302c to receiver antennas 104a–104c respectively. Radio channels 301a–301c and 302a–302c may introduce fading and time dispersion. Omnipresent thermal noise processes $n_a$–$n_c$ are also received by receiver antennas 104a–104c respectively. Each antenna 104a–104c is coupled to a radio unit 105a–105c respectively which amplifies, downconverts, and filters the received signals according to known methods to produce an analog signal. Each analog signal is coupled to an analog-to-digital (ND) converter 106a–106c which converts the analog signals into received signal sample streams $r_a(kT_s)$, $r_b(kT_s)$, and $r_c(kT_s)$. One method for conversion from analog to digital is to use log-polar signal processing, as described in U.S. Pat. No. 5,048,059 to Dent incorporated by reference herein in its entirety. For subsequent processing, a conversion from log-polar to rectangular samples is made, so that, for example, I and Q samples, sometimes referred to as complex samples, are used. By using log-polar signal processing initially, a limiting receiver which provides signal strength and phase samples can be used, and adaptive gain control can be made simple.

In an MLSE equalizer, all possible transmitted symbol sequences S are considered. In one implementation, hypothesized symbol values $S_h(n)$ are filtered by channel tap estimates $c_a(\tau)$, $c_b(\tau)$, and $c_c(\tau)$ to produce hypothesized received samples $r_{a,h}(n)$, $r_{b,h}(n)$, and $r_{c,h}(n)$ for each antenna. The differences between the hypothesized $r_{a,h}(n)$–$r_{c,h}(n)$ and the actual $r_a(n)$–$r_c(n)$ received signal sample streams, referred to as the hypothesis errors, give an indication of how good a particular hypothesis is. The squared magnitude of the hypothesis error is used as a metric to evaluate a particular hypothesis. The metric is accumulated for different hypotheses for use in determining which hypotheses are better using the sequence estimation algorithm. This process may be efficiently realized using the Viterbi algorithm, which is a known form of dynamic programming. A description of the Viterbi alrogithm may be found in Forney, G., "The Viterbi Algorithm", *Proc. of the IEEE*, vol. 61, pp. 268–278, March, 1973. As is obvious to one of ordinary skill in the art, other sequence estimation algorithms, such as the M-algorithm, may also be used.

In an MLSE equalizer, there are states associated with different symbol sequence hypotheses $s_h(n)$. At a given iteration, there are previous states: each associated with an accumulated metric. Each pairing of a previous state with a current state results in a branch metric, $M_h(n)$. The candidate metric for a current state is then the sum of the branch metric $M_h(n)$ and the previously accumulated metric. For each current state, the previous state which gives the smallest candidate metric is selected as the predecessor state, and the smallest candidate metric becomes the accumulated metric for the current state. For metric combining, as described in aforementioned U.S. Pat. No. 5,191,598, the branch metric can be expressed as:

$$M_h(n) = [r(n) - Cs_h(n)]^H D[r(n) - Cs_h(n)]$$

where:

$$r(n) = [r_a(n) r_b(n) r_c(n)]$$

$$C = \begin{bmatrix} c_a(0) \ldots c_a(N_t - 1) \\ c_b(0) \ldots c_b(N_t - 1) \\ c_c(0) \ldots c_c(N_t - 1) \end{bmatrix}$$

$$s_h(n) = [s_h(n) s_h(n-1) \ldots]^T$$

$$D = \begin{bmatrix} K_a & 0 & 0 \\ 0 & K_b & 0 \\ 0 & 0 & K_c \end{bmatrix}$$

The channel tap estimates for each signal received on antenna 104a–104c are designated by $c_a(\tau)$, $c_b(\tau)$, $c_b(\tau)$ respectively where $\tau$ is the delay (i.e. $\tau=0$ is the main ray, $\tau=1$ is the first echo, etc.). $N_t$ is the number of channel taps estimated per antenna and $K_a$, $K_b$, $K_c$ are weighting coefficients for antennas 104a–104c respectively.

The present invention takes advantage of the fact that, from a diversity and equalization point-of-view, the impairment (interference+noise) on multiple receive antennas 104 is often correlated. By expanding diversity combining techniques to exploit this correlation, significant gains are realized. For optimal performance, a whitening, or decorrelation, process may be applied and the optimum branch metric may include the inverse of the impairment correlation matrix. The optimum branch metric $M_h(n)$ according to the present invention is:

$$M_h(n) = [r(n) - C(n)s_h(n)]^H A(n)[r(n) - C(n)s_h(n)] = e_h^H(n) A(n) e_h(n)$$

where:

$A(n) = R_{zz}(n)^{-1}$, or a related quantity; $R_{zz}(n) = E(z(n)z^H(n))$ $$z(n) = [z_a(n) z_b(n) z_c(n)]^T; \quad e_h(n) = r(n) - C(n)s_h(n)$$

The time varying nature of the channel and the impairment correlation are denoted with time index n. The $R_{zz}(n)$ matrix is referred to as the impairment correlation matrix at discrete time, n. The $A(n)$ matrix (i.e., the A-matrix) is the inverse of the $R_{zz}(n)$ matrix, or a related quantity such as the adjoint or pseudo-inverse. As is obvious to one of ordinary skill in the art, $R_{zz}(n)$ and $A(n)$ are specific examples of impairment correlation properties of which other forms are known. Throughout the following, the term A-matrix is used generically to refer to any estimate of the impairment correlation properties.

The impairments on antennas 104a–104c at time n are designated by $z_a(n)$, $z_b(n)$, and $z_c(n)$ respectively. For a given hypothesis, $e_h(n)$ is an estimate of the impairment process. As shown above, the A-matrix, $A(n)$, is the inverse of the impairment correlation matrix $R_{zz}(n)$. For the case of uncorrelated impairment (i.e., no interferer) the A-matrix reduces to diagonal matrix D. When the signal is known or detected correctly, the impairment is given by:

$$z(n) = r(n) - C(n)s_{det}(n)$$

where:

$$s_{det}(n) = [s_{det}(n) s_{det}(n-1) \ldots]^T$$

Note that $s_{det}(n)$ is the known or detected symbol sequence at time n.

Determination of the A-matrix for use in the present invention can be performed in a number of ways depending upon the specific application and the required performance. The simplest approach is to use a fixed set of values for the A-matrix, stored in memory, that are never updated. These values depend primarily on the configuration of the receive antennas and on the carrier frequencies being employed. An alternative approach is to determine the A-matrix from synchronization information and to keep the A-matrix values constant between synchronization, or other, known fields. At each new occurrence of the synchronization field, the A-matrix can be recomputed, with or without use of the previous A-matrix values. Another alternative approach is to use synchronization fields to initialize, or improve, the A-matrix values and then to use decisions made on the data field symbols to track the A-matrix values.

Also, consideration is given for the method used to track the A-matrix values. Since the A-matrix comprises information regarding the impairment correlation properties standard estimation methods for estimating correlation or inverse correlation matrices can be applied. Using either known or detected symbol values, impairment values can be obtained by taking the differences between the received signal sample streams $r_a(n)$-$r_c(n)$ and the hypothesized received signal sample streams $r_{a,h}(n)$-$r_{c,h}(n)$. At time n, this gives a vector of impairment values, denoted $z(n)$; one value for each antenna. A straightforward way of forming the A-matrix is given by:

$$R(n) = \lambda R(n-1) + Kz(n)z^H(n)$$

$$A(n) = R^{-1}(n)$$

K is a scaling constant, typically 1 or $\sqrt{(1-\lambda)}$. Because $R(n)$ is a Hermitian matrix, only a portion of the matrix elements need be computed.

Such a straightforward approach is fairly high in complexity. One way to reduce complexity is to apply the matrix inversion lemma and update the A-matrix directly as:

$$A(n) = \frac{1}{\lambda} \left[ A(n-1) - \left( \frac{1}{\lambda + z(n)^H p(n)} \right) p(n) p^H(n) \right]$$

where:

$$p(n) = A(n-1)z(n)$$

Because the A-matrix is Hermitian, it is only necessary to compute those elements on the diagonal and either those elements above or below the diagonal.

These techniques for estimating and tracking the A-matrix are given only for purposes of illustration. In general, the A-matrix can be expressed and estimated in a variety of ways, as is obvious to one of ordinary skill in the art. See, for example, the book by S. Haykin, *Adaptive Filter Theory*, Second Edition, Prentice-Hall, Englewood Cliffs, N.J., 1991. The present invention may also be applied to the blind equalization problem in which known synchronization sequences are absent. In this case, the A-matrix is estimated in a manner similar to how the channel is estimated.

For the purposes of illustration, the present invention will now be described in greater detail as exemplified in four different embodiments.

Description of Embodiment having a Symbol-Spaced Equalizer with Two Antennas and Adaptive Channel Estimates In a first embodiment, a processor 107 having a symbol-spaced (i.e., T-spaced) equalizer is presented where the channel must be tracked over the data field, or burst. This embodiment is applicable to the digital cellular system defined by the IS-54B specification which has relatively long TDMA data bursts, or time slots, (6.67 milliseconds) with respect to time. For this embodiment, the branch metric processor 203 is illustrated in greater detail in FIG. 4 where, for simplicity, the number of antennas is further restricted to two: designated a and b. This particular embodiment has usefulness in that the use of two receive antennas is common in many cellular systems which already employ some form of diversity combining. As before, it is obvious to one of ordinary skill in the art that this embodiment may also be employed in the case where there are three or more antennas.

The impairment correlation matrix $R_{zz}$ and the inverse impairment correlation matrix A are defined as follows:

$$R_{zz} = P = \begin{bmatrix} p_{aa} & p_{ab} \\ p_{ab}^* & p_{bb} \end{bmatrix}$$

$$R_{zz}^{-1} = \frac{1}{(p_{aa}p_{bb} - |p_{ab}|^2)} \begin{bmatrix} p_{bb} & -p_{ab} \\ -p_{ab}^* & p_{aa} \end{bmatrix} = w \begin{bmatrix} p_{bb} & -p_{ab} \\ -p_{ab}^* & p_{aa} \end{bmatrix} = A$$

The variable $p_{aa}$ denotes the impairment power received on antenna a; the variable $p_{bb}$ denotes the impairment power received on antenna b. The off-diagonal matrix elements are the cross correlation values: $p_{ab}$ denotes the correlation of the impairment received on antenna a with the conjugate of that received on antenna b.

The branch metric then becomes:

$$M_h(n) = e_h(n)^H A(n) e_h(n) = w[p_{bb}|e_{a,h}(n)|^2 - 2Re\{p_{ab}e_{a,h}(n)^* e_{b,h}(n)\} + p_{aa}|e_{b,h}(n)|^2]$$

where:

$$w = \frac{1}{p_{aa}p_{bb} - |p_{ab}|^2} \text{ and } e_{d,h}(n) = r_d(n) - r_{d,h}(n)$$

Figure 4:
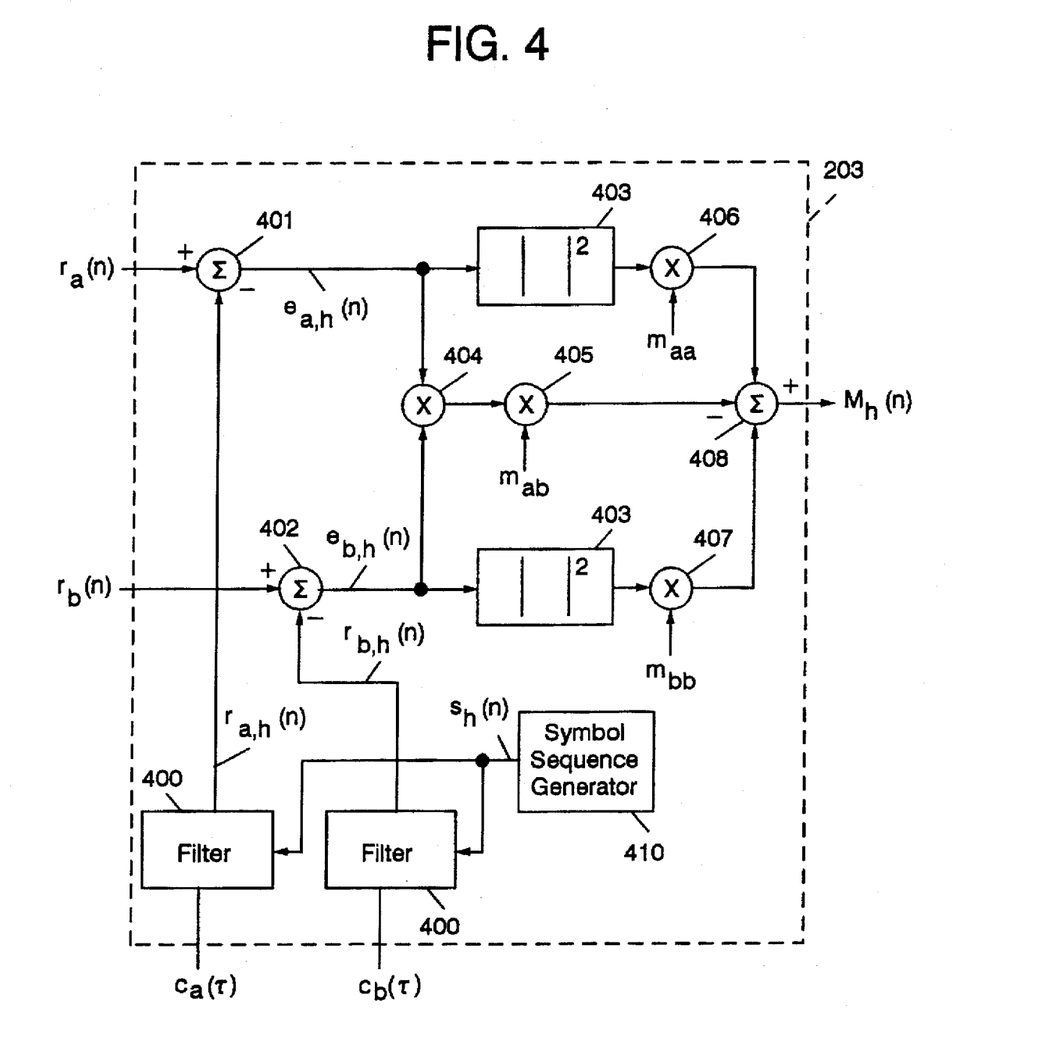
FIG. 4 is a schematic illustration of a branch metric processor according to the present invention.

The calculation of this branch metric is schematically illustrated in FIG. 4.

A symbol sequence generator 410 generates hypothesized symbol sequences $s_h(n)$. These sequences are filtered in filters 400 using channel tap estimates $c_a(\tau)$ and $c_b(\tau)$ for antennas a and b to produce hypothesized received signal samples $r_{a,h}(n)$ and $r_{b,h}(n)$, respectively. The hypothesized received signal samples, $r_{a,h}(n)$, are subtracted from the actual received signal samples from antenna a, $r_a(n)$, in summing junction 401 to produce error signals $e_{a,h}(n)$. Similarly hypothesized received signal samples, $r_{b,h}(n)$, are subtracted from the actual received signal samples from antenna b, $r_b(n)$, in summing junction 402 to produce error signals $e_{b,h}(n)$. Blocks 403 form the squared magnitudes of the error signals $e_{a,h}(n)$ and $e_{b,h}(n)$. The squared magnitude for error signals $e_{a,h}(n)$ is multiplied at junction 406 by multiplier $m_{aa}$, the result being coupled to summing junction 408. The squared magnitude for error signals $e_{b,h}(n)$ are multiplied at junction 407 by multiplier $m_{bb}$, the result being coupled to summing junction 408. Finally, multiplier 404 forms the product of $e_{a,h}(n)$ and $e^*_{b,h}(n)$, the product of which is subsequently multiplied by multiplier $m_{ab}$ in multiplier 405, forming the real part only. The result is subtracted in summing junction 408, the output of which is the branch metric $M_h(n)$. The multipliers $m_{aa}$, $m_{bb}$, and $m_{ab}$ are related to the impairment correlation matrix by:

$$m_{aa} = wp_{bb}$$

$$m_{bb} = wp_{aa}$$

$$m_{ab} = 2wp_{ab}$$

As is obvious to one skilled in the art the w term is common to the branch metric calculation and may be applied in a different manner or even omitted when the denominator to w approaches zero.

At time n, the A matrix elements are updated as:

$$p_{aa}(n+1) = \lambda p_{aa}(n) + |e_a(n)|^2 K$$

$$p_{ab}(n+1) = \lambda p_{ab}(n) + e_a(n) e_b^*(n) K$$

$$p_{bb}(n+1) = \lambda p_{bb}(n) + |e_b(n)|^2 K$$

K is a scaling factor which, if equal to unity, is dropped from the calculation to reduce the number of computations. K may be derived from $\lambda$ which is the so-called "forgetting factor".

Figure 5:
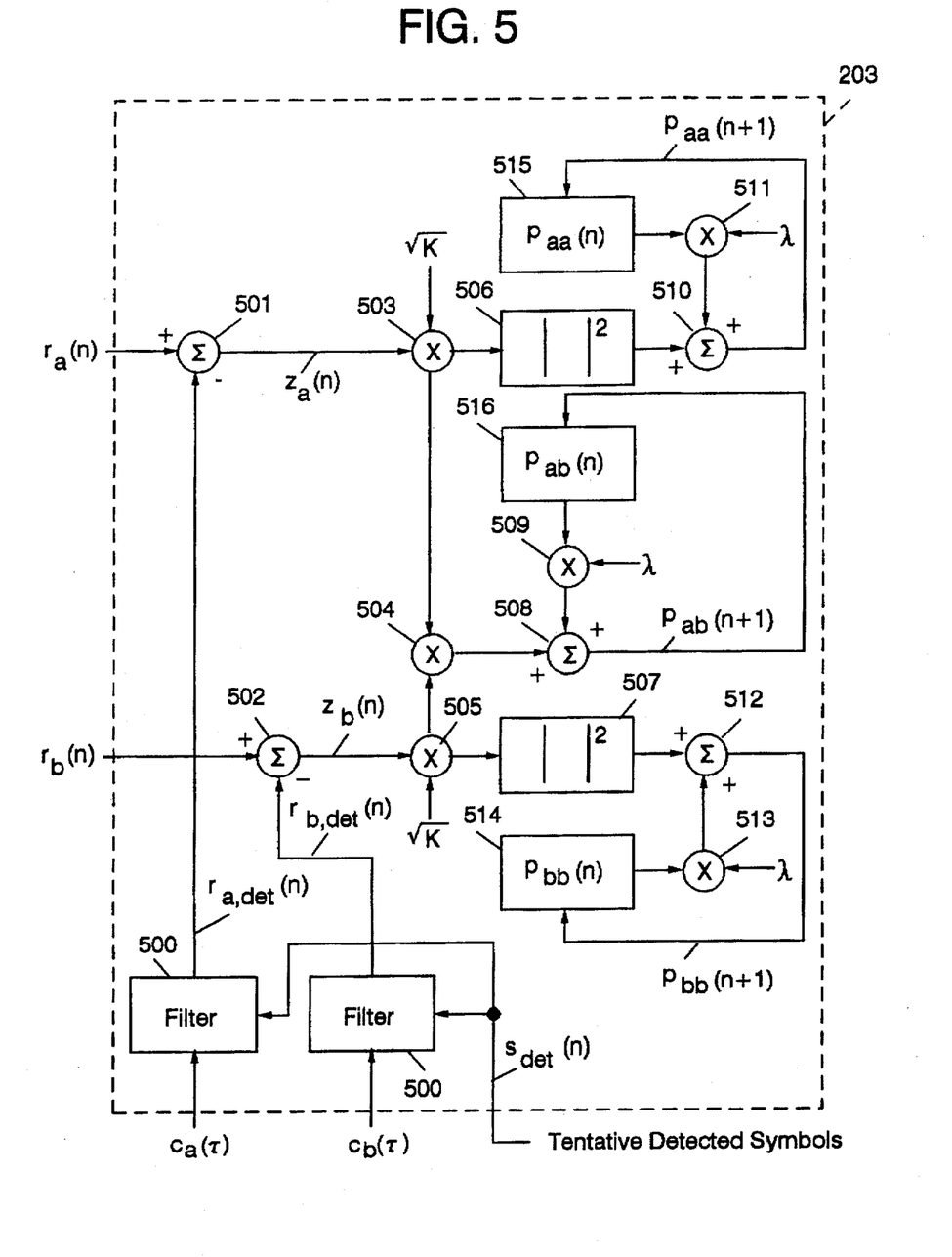
FIG. 5 is a schematic illustration of an adaptive estimator of the impairment correlation properties.

A schematic illustration of the impairment correlation matrix update is shown in FIG. 5. Tentative detected symbol values $s_{det}(n)$ from sequence estimation processor 204 are filtered in filters 500 using channel tap estimates $c_a(\tau)$ and $c_b(\tau)$ from channel tap estimators 202 for antennas a and b to produce expected received samples $r_{a,det}(n)$ and $r_{b,det}(n)$, respectively. Impairment signal $z_a(n)$ is produced by subtracting, in summing junction 501 $r_{a,det}(n)$ from the actual received signal samples from antenna a, $r_a(n)$. Similarly, impairment signal $z_b(n)$ is produced by subtracting, in summing junction 502 $r_{b,det}(n)$ from the actual received signal samples on antenna b, $r_b(n)$. If the tentative detected symbol values are correct and the channel tap estimates are accurate, then error signals $z_a(n)$ and $z_b(n)$ represent the impairment received on antennas a and b respectively. Impairment signals $z_a(n)$ and $z_b(n)$ are scaled by the root of the scaling factor K in multipliers 503 and 505 respectively to produce scaled impairment signals which are coupled to blocks 506 and 507, respectively.

The impairment power received on antenna a, $p_{aa}(n)$, is multiplied in multiplier 511 by the forgetting factor, $\lambda$, and summed in junction 510 with the squared magnitude of the scaled impairment signal from block 506 to produce the updated impairment power $p_{aa}(n+1)$. The value of $p_{aa}(n+1)$ is then used to overwrite the memory location 515 of the previous impairment power $p_{aa}(n)$. Similarly, the previous impairment power received on antenna b, $p_{bb}(n)$, is multiplied in multiplier 513 by the forgetting factor, $\lambda$, and summed in junction 512 with the squared magnitude of the scaled error signal from block 507 to produce the updated impairment power $p_{bb}(n+1)$ which is used to overwrite the memory location 514 of the previous impairment power $p_{bb}(n)$. To produce the updated impairment cross correlation, the scaled error signal from multiplier 503 is multiplied with the conjugate of the scaled error signal from multiplier 505 in junction 504. Also, the previous cross-correlation $p_{ab}(n)$, stored in memory 516, is scaled by the forgetting factor in multiplier 509. The output of junction 504 is summed in junction 508 with the output of multiplier 509 to yield the updated cross correlation $p_{ab}(n+1)$. As before, the updated value $p_{ab}(n+1)$ is used to overwrite the memory location 516 of the previous value $p_{ab}(n)$.

There is typically a delay in updating the channel tap estimates which allows the tentative detected symbols to become reliable. In U.S. Pat. No. 5,164,961 by Gudmundson, et al., incorporated herein by reference in its entirety, this delay is lo avoided by using multiple channel models: one for each state in the sequence estimation processor 204. With the present invention, there is also a delay in updating the A-matrix quantities. It is obvious to one of ordinary skill in the art that this delay can be avoided by using multiple A-matrices; one for each state in the sequence estimation processor 204.

Description of Embodiment having a Symbol-Spaced Equalizer with Two Antennas and Fixed Channel Estimates In a second embodiment a receiver having a symbol-spaced equalizer is presented where the channel can be considered static over a TDMA burst. This embodiment is applicable to the digital cellular system defined by the pan-European GSM specification which has relatively short (577 microseconds) TDMA data fields with respect to time. In this case, the impairment correlation matrix $R_{zz}$, and hence the A-matrix, do not vary over the burst and can be estimated from the sync word embedded in the GSM frame. In this instance, the branch metric can be expressed as:

$$M_h(n) = [r(n) - Cs_h(n)]^H A(r(n) - Cs_h(n))$$

$$M_h(n) = r^H(n) A r(n) - 2Re\{s_h(n)^H C^H A r(n)\} + s_h(n)^H C^H A C s_h(n)$$

Figure 6:
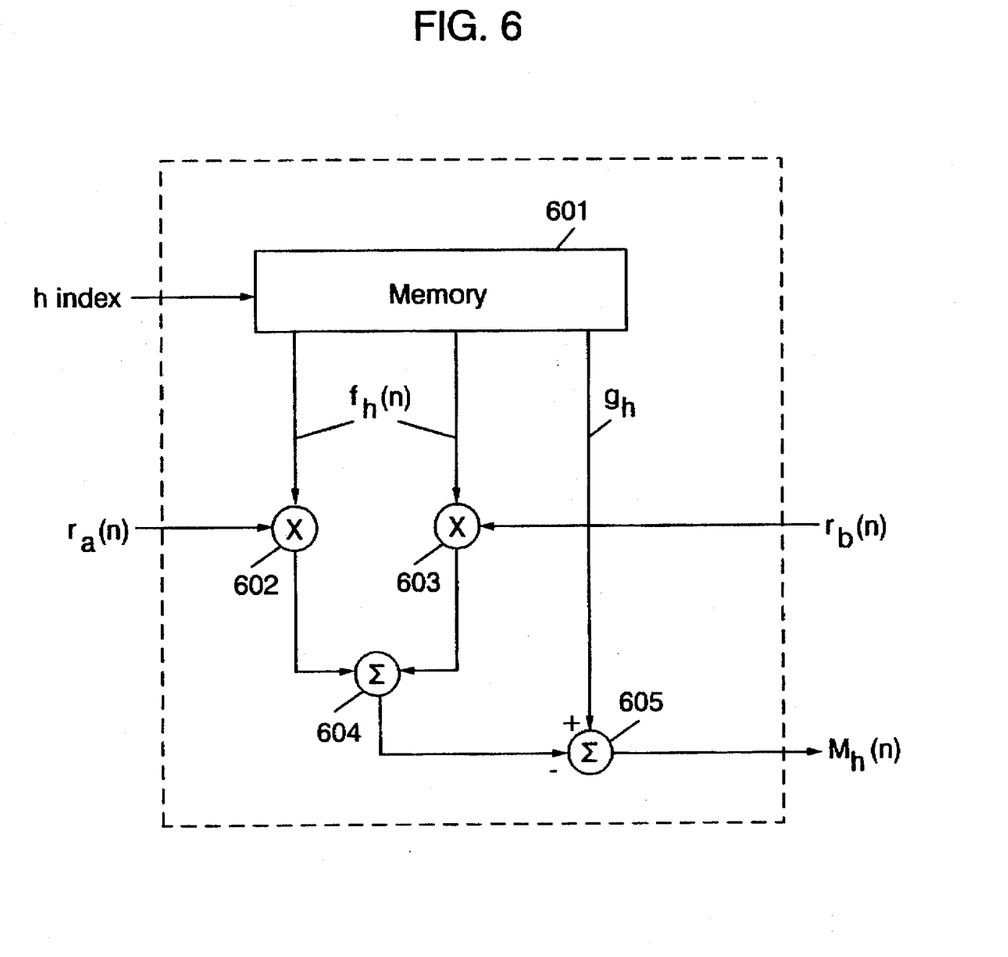
FIG. 6 is a schematic illustration of yet another embodiment of a branch metric processor according to the present invention.

Referring now to FIG. 6, processing time is saved by pre-computing and storing in memory 601 the following values for all possible hypothetical symbol sequences, $s_h$:

$$f_h = 2A^H C s_h$$

$$g_h = s_h^H C^H A C s_h$$

Using these pre-computed values, the branch metric may be simplified as:

$$M_h(n) = -Re\{f_h^H r(n)\} + g_h$$

where:

$$r(n) = [r_a(n) r_b(n)]^T$$

For each hypothesized symbol sequence $s_h(n)$, the received signal samples $r_a(n)$ and $r_b(n)$ are multiplied in blocks 602 and 603, respectively, by the corresponding $f_h$ value, which was precomputed as described above and retrieved from memory 601; only the real parts of the products are formed. The h-index refers to the hypothesis index which relates a particular $f_h$ value to a particular hypothesized symbol sequence $s_h(n)$. The output of multipliers 602 and 603 are coupled to summing junction 604 where they are summed and the results passed to junction 605 where the output of junction 604 is subtracted from the corresponding $g_h$ value: also precomputed as described above and retrieved from memory 601. The result is the branch metric $M_h(n)$.

Figure 7:
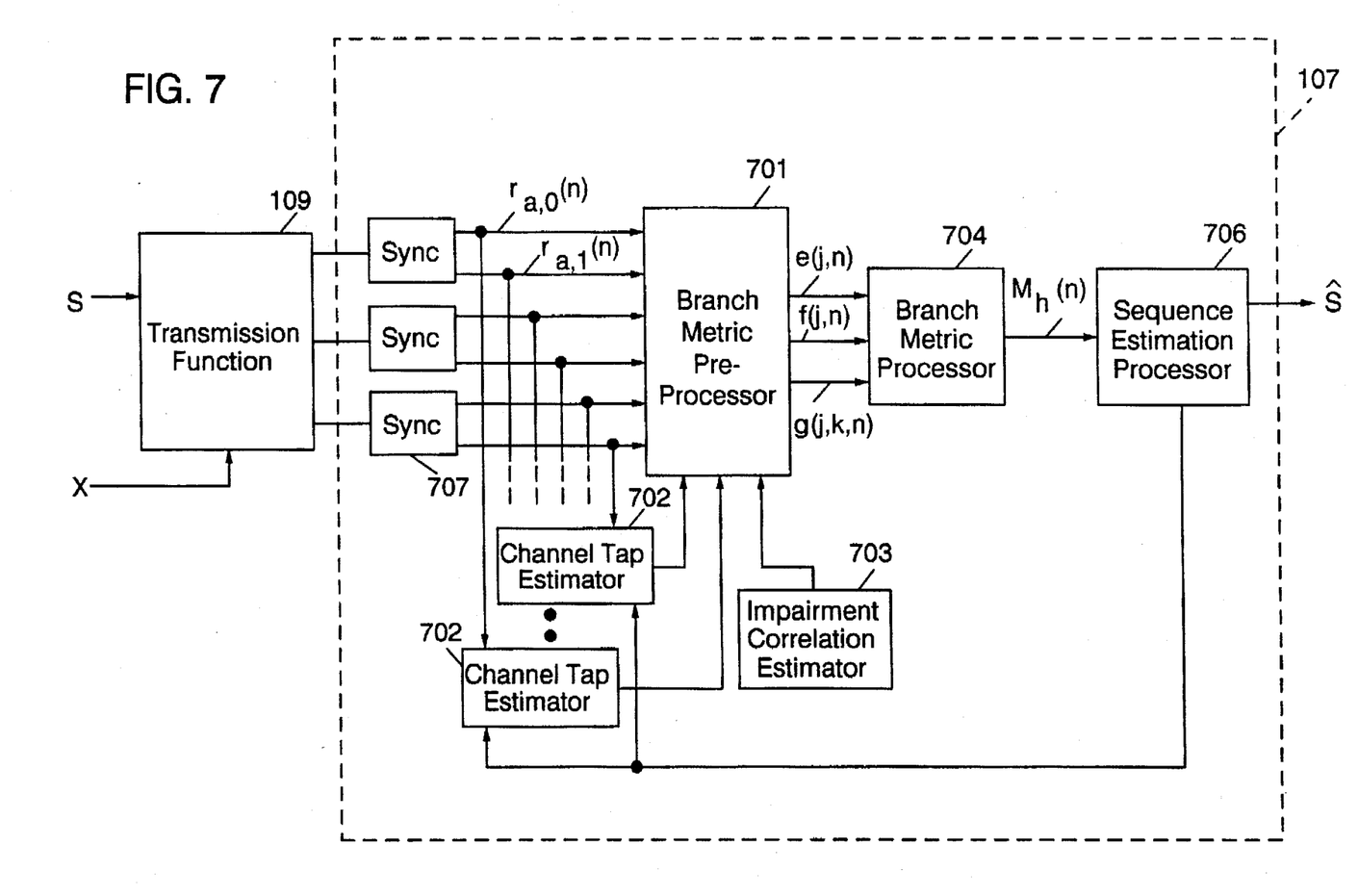
FIG. 7 is a schematic illustration of another embodiment of a receiver processor and a transmission function according to the present invention.

Description of Embodiment having a Fractionally-Spaced Equalizer with one or more Antennas and Adaptive Channel Estimates with Partial Optimization In a further embodiment a receiver having one or more antennas coupled to a processor 107 comprising a fractionally-spaced (T/M) equalizer with adaptive channel tracking is presented. This particular embodiment is applicable to the digital cellular system defined by the IS-54B specification which has relatively long (6.67 milliseconds) time slots, or bursts, such that the channel tap estimates need to be updated during the duration of the burst. For this embodiment, receiver processor 107 is illustrated in greater detail in FIG. 7 where, for simplicity, only a single interferer X and three antennas designated a, b, c are considered and M=2. It is obvious to one of ordinary skill in the art that the present invention may be practiced with a plurality of interferers and a plurality of antennas and a fractional spacing other than M=2. The transmission function 109 shown in FIG. 7 is, for example, identical to that described by FIG. 3 which produces three received signal sample streams: $r_a(kT_s)$, $r_b(kT_s)$ and $r_c(kT_s)$. The received signal sample streams: $r_a(kT_s)$-$r_c(kT_s)$ are each coupled to a signal preprocessor 707 which performs correlations with a known synchronization pattern similar to that described for block 206 of FIG. 2. Timing is determined from the correlation values using some optimization criterion, such as maximum energy in the channel taps. In this particular embodiment, since M has been chosen equal to 2, each signal preprocessor 707 produces, from each incoming received signal sample stream, two samples per symbol. For example, as shown in FIG. 7, $r_{a,0}(n)$, $r_{a,1}(n)$ are generated from received signal sample stream $r_a(kT_s)$. Similarly $r_{b,0}(n)$, $r_{b,1}(n)$ and $r_{c,0}(n)$, $r_{c,1}(n)$ are produced from received signal sample streams $r_b(kT_s)$ and $r_c(kT_s)$ respectively. If, for example, M is chosen to be equal to 4 then 4 samples per symbol would be produced. These signals, $r_{a,0}(n)$, $r_{a,1}(n)$, $r_{b,0}(n)$, $r_{b,1}(n)$, $r_{c,0}(n)$, and $r_{c,1}(n)$, are coupled to the branch metric preprocessor 701 where they are treated as though each signal, $r_{a,0}(n)$, $r_{a,1}(n)$, $r_{b,0}(n)$, $r_{b,1}(n)$ $r_{c,0}(n)$, and $r_{c,1}(n)$, arrived from a separate antenna.

In practice, one can expand the expression for the branch metric and collect computations to provide a lower complexity implementation. Two techniques can be used to reduce complexity: a) expand the branch metric expression and collect like terms, and b) reorder at which iterations certain terms are computed. Using the first technique, metric multipliers, which can be pre-computed for all hypotheses, are expressed as:

$$e(j,n) = c^H(j,n) A(n) r(n)$$

$$f(j,n) = c^H(j,n) A(n) c(j,n)$$

$$g(j,k,n) = c^H(j,n) A(n) c(k,n) \text{ where } k > j$$

where $c(j,n)$ is the jth column of $C(n)$. J is the number of channel taps. In other words, the received signal vector $r(n)$ is modeled as:

$$r(n) = \sum_{j=0}^{J} s_h(n-j) c(j,n)$$

The values $e(j,n)$, $f(j,n)$, and $g(j,k,n)$ are computed by the branch metric preprocessor 701 and stored in memory (not shown). The indices j and k are ray indices. The values $e(j,n)$, $f(j,n)$, and $g(j,k,n)$ are referred to as metric multipliers since they can be used in multiplications to form the equalizer metrics in branch metric processor 704. The values $e(j,n)$, $f(j,n)$, and $g(j,k,n)$ are coupled to branch metric processor 704 which computes the branch metric $M_h(n)$ according to:

$$M_h(n) = -\sum_{j=0}^{J-1} 2Re\{e(j,n) s_h^*(n-j)\} + \sum_{j=0}^{J-1} f(j,n) |s_h(n-j)|^2 + 2 \sum_{j=0}^{J-1} \sum_{k=j+1}^{J-1} 2Re\{g(j,k,n) s_h^*(n-j) s_h(n-k)\}$$

In systems where all symbols have the same amplitude, such as binary phase shift keying (BPSK) and quaternary phase shift keying (QPSK) systems, the term $|s_h(n-j)|^2$ is a constant, independent of hypothesis. Thus, this term can be dropped, obviating the need to compute and use the f(j,n) metric multipliers.

While the embodiment was illustrated for the case of three antennas, it is obvious to one of ordinary skill in the art that the present invention may be practiced with a single antenna and fractionally-spaced equalization.

Figure 8:
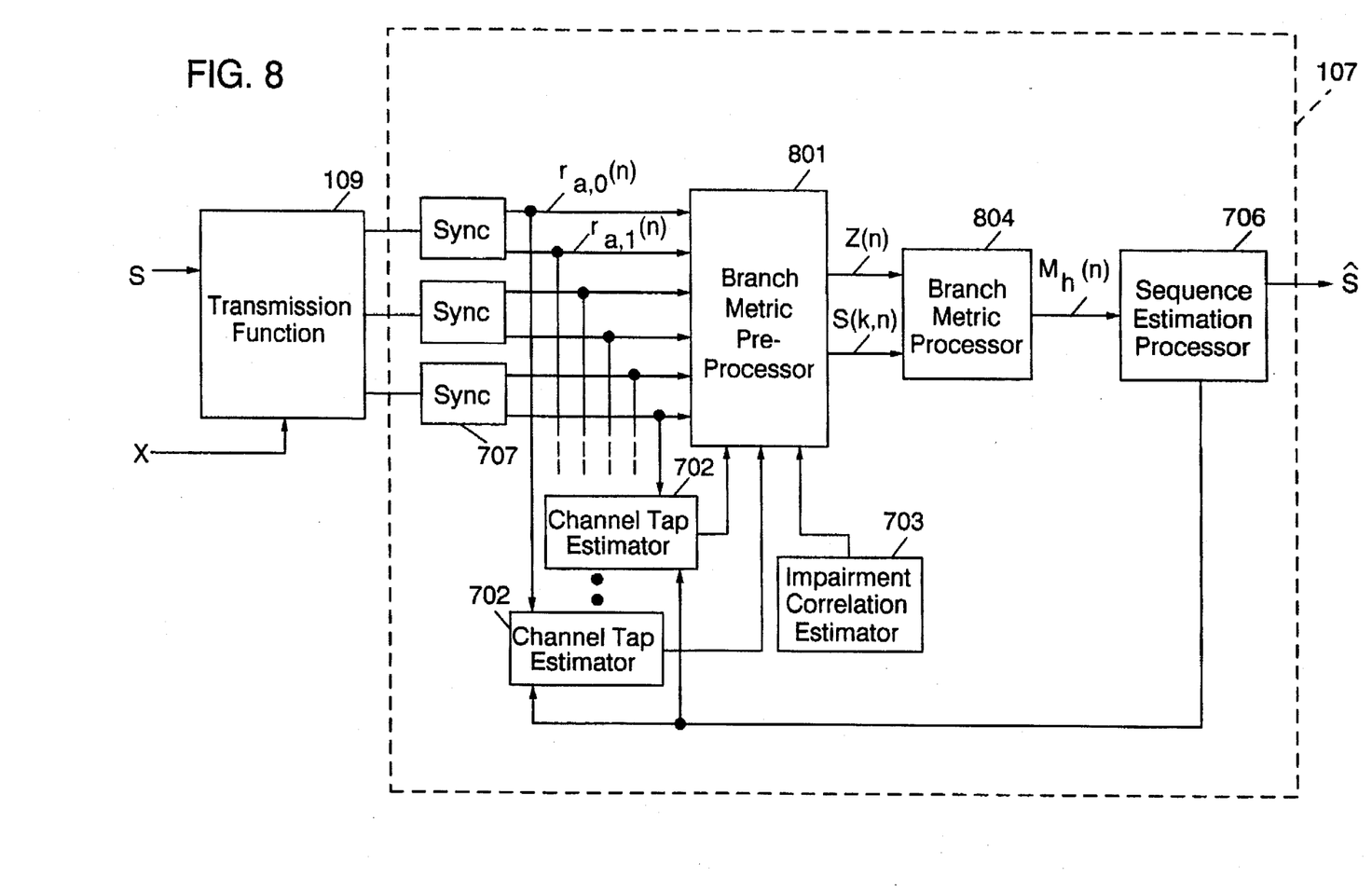
FIG. 8 is a schematic illustration of yet another embodiment of a receiver processor and a transmission function according to the present invention.

Description of Embodiment having a Fractionally-Spaced Equalizer with one or more Antennas and Adaptive Channel Estimates with Full Optimization A further reduction in complexity can be achieved by employing the receiver processor 107 shown in FIG. 8. The receiver processor 107 of FIG. 8 is essentially identical to that of FIG. 7 with the difference being the branch metric preprocessor 801 and the branch metric processor 804. As shown in FIG. 8, branch metric preprocessor 801 pre-computes and stores in memory (not shown) the following alternate metric multipliers:

$$Z(n) = \sum_j c^H(j,n+j)A(n+j)r(n+j)$$

$$S(k,n) = \sum_j c^H(j,n+j)A(n+j)c(j+k,n+j)$$

In practice, it may be advantageous to approximate $A(n+j)$ with $A(n)$ and $c(j,n+j)$, $c(j+k,n+j)$ with $c(j,n)$, $c(j+k,n)$ respectively. Alternate metric multipliers $Z(n)$ and $S(k,n)$ are coupled to branch metric processor 804 which computes the branch metric according to:

$$M_h(n) = Re\left\{ s_h*(n)\left[ -2Z(n) + s_h(n)S(0,n) + \sum_{k \geq 1} 2S(k,n)s_h(n-k) \right] \right\}$$

While the embodiment was illustrated for the case of three antennas, it is obvious to one of ordinary skill in the art that the present invention may be practiced with a single antenna and fractionally-spaced equalization. While the present invention has further been described with respect to a particular digital cellular communications system, those skilled in the art will recognize that the present invention is also applicable to other communications systems and that therefore the present invention is not limited to the specific embodiments described and illustrated herein. Different embodiments and adaptations besides those shown and described as well as many variations, modifications and equivalent arrangements will now be reasonably suggested by the foregoing specification and drawings without departing from the substance or scope of the invention. While the present invention has been described herein in detail in relation to its preferred embodiments, it is to be understood that this disclosure is only illustrative and exemplary of the present invention and is merely for the purposes of providing a full and enabling disclosure of the invention. Accordingly, it is intended that the invention be limited only by the spirit and scope of the claims appended hereto.

What is claimed is:

1. A method for reducing the effects of signal fading, time dispersion, and interference in a radio communications system, comprising the steps of:

(a) generating and transmitting a signal representing a transmitted symbol sequence;

(b) receiving said signal on at least two separate receive antennas;

(c) processing said signal to produce received signal samples for each of said receive antennas;

(d) estimating channel taps for each of said receive antennas to produce channel tap estimates;

(e) estimating impairment correlation properties among the receive antennas to produce an estimate of impairment correlation properties;

(f) forming branch metrics in a branch metric processor using said received signal samples, said channel tap estimates, and said estimate of impairment correlation properties; and (g) employing said branch metrics in a sequence estimation algorithm to estimate said transmitted symbol sequence.

2. A method according to claim 1, in which processing step (c) employs log-polar signal processing.

3. A method according to claim 1, in which said estimate of impairment correlation properties is represented as the inverse of an impairment correlation matrix.

4. A method according to claim 1, in which said forming step (f) comprises:

(a) generating hypothetical symbol sequences;

(b) filtering said hypothetical signal sequences with said channel tap estimates to produce hypothesized received signal samples for each antenna;

(c) subtracting said hypothesized received signal samples from the received signal samples to produce hypothesized error signals; and (d) processing said hypothesized error signals with said estimate of impairment correlation properties to produce branch metrics.

5. A method according to claim 1, in which said estimating step (e) comprises:

(a) generating tentative detected symbol sequences;

(b) filtering said tentative detected symbol sequences with said channel tap estimates to produce detected signal samples for each antenna;

(c) subtracting said detected signal samples from the received signal samples to produce detected error signals; and (d) processing said detected error signals with said estimate of impairment correlation properties to produce an updated estimate of said impairment correlation properties.

6. The method of claim 1, in which said forming step (f) comprises:

a) generating hypothetical symbol sequences;

b) calculating pre-computed values for all of said hypothetical symbol sequences using said channel tap estimates and said estimate of impairment correlation properties; and c) processing said received signal samples with said pre-computed values to produce branch metrics.

7. A method according to claim 1, in which said forming step (f) comprises:

a) generating hypothetical symbol sequences;

b) combining the received signal samples with channel tap estimates and said estimate of impairment correlation properties to produce metric multipliers e(j,n);

c) combining said channel tap estimates with one another and said estimate of impairment correlation properties to produce metric multipliers f(j,n) and g(j,k,n); and d) combining said metric premultipliers with said hypothetical symbol sequences to produce branch metrics.

8. A method according to claim 1, in which said forming step (f) comprises:

a) generating hypothetical symbol sequences;

b) combining the received signal samples with channel tap estimates and said estimate of impairment correlation properties to produce metric multipliers e(j,n);

c) combining said channel tap estimates with one another and said estimate of impairment correlation properties to produce metric multipliers $g(j,k,n)$; and d) combining said metric premultipliers with said hypothetical symbol sequences to produce branch metrics.

9. The method of claim 1, in which said employing step (g) further comprises the use of the Viterbi algorithm.

10. A method according to claim 1, in which said forming step (f) comprises:

a) generating hypothetical symbol sequences;

b) combining said received signal samples with said channel tap estimates and said estimate of impairment correlation properties to produce $Z(n)$ values;

(b) combining said channel tap estimates with one another and said estimate of impairment correlation properties to produce $S(k,n)$ values; and (c) combining said $Z(n)$ and $S(k,n)$ values with said hypothetical symbol sequences to produce branch metrics.

11. An apparatus for reducing the effects of signal fading, time dispersion, and interference in a radio communications system, comprising:

a digital transmitter for generating and transmitting a signal representing a transmitted symbol sequence;

a receiver for receiving said signal on at least two separate receive antennas;

an analog to digital converter for converting said signal into received signal samples for each of said receive antennas;

a channel tap estimator for estimating channel taps for each of said receive antennas to produce channel tap estimates;

an impairment correlation estimator for estimating impairment correlation properties among the receive antennas to produce an estimate of impairment correlation properties;

a branch metric processor for forming branch metrics using said received signal samples, said channel tap estimates, and said estimate of impairment correlation properties; and a sequence estimation processor employing said branch metrics to estimate said transmitted symbol sequence.

12. The apparatus of claim 11, in which said analog to digital converter employs log-polar signal processing.

13. The apparatus of claim 11, in which said branch metric processor comprises:

a symbol sequence generator for generating hypothetical symbol sequences;

means for filtering said hypothetical signal sequences with said channel tap estimates to produce hypothesized received signal samples for each antenna;

means for subtracting said hypothesized received signal samples from the received signal samples to produce hypothesized error signals; and means for processing said hypothesized error signals with said estimate of impairment correlation properties to produce branch metrics.

14. The apparatus of claim 11, in which said impairment correlation estimator comprises:

a symbol sequence generator for generating tentative detected symbol sequences;

a digital filter for filtering said tentative detected symbol sequences with said channel tap estimates to produce detected signal samples for each antenna;

means for subtracting said detected signal samples from the received signal samples to produce detected error signals; and means for processing said detected error signals with said estimate of impairment correlation properties to produce an update of the estimate the impairment correlation properties.

15. The apparatus of claim 11, in which said branch metric processor comprises:

a symbol sequence generator for generating hypothetical symbol sequences;

means for calculating pre-computed values for all of said hypothetical symbol sequences using said channel tap estimates and said estimate of impairment correlation properties; and means for processing said received signal samples with said pre-computed values to produce branch metrics.

16. The apparatus of claim 11, in which said branch metric processor comprises:

a symbol sequence generator for generating hypothetical symbol sequences;

means for combining the received signal samples with the channel tap estimates and said estimate of impairment correlation properties to produce metric multipliers $e(j,n)$ and for combining said channel tap estimates with one another and said estimate of impairment correlation properties to produce metric multipliers $f(j,n)$ and $g(j,k,n)$; and for combining said metric multipliers with said hypothetical symbol sequences to produce branch metrics.

17. The apparatus of claim 11, in which said branch metric processor comprises:

a symbol sequence generator for generating hypothetical symbol sequences;

means for combining said received signal samples with said channel tap estimates and said estimate of impairment correlation properties to produce $Z(n)$ values and combining said channel tap estimates with one another and said estimate of impairment correlation properties to produce $S(k,n)$ values and for combining said $Z(n)$ and $S(k,n)$ values with said hypothetical symbol sequences to produce branch metrics.

18. The apparatus of claim 11, in which said sequence estimation processor employs the Viterbi algorithm.

19. A method for reducing the effects of signal fading, time dispersion, and interference in a radio communications system, comprising the steps of:

(a) generating and transmitting a signal representing a transmitted symbol sequence;

(b) receiving said signal on one receive antenna;

(c) processing said signal to produce a plurality of received signal sample(s) streams for said receive antenna such that there is one signal sample per symbol period in each of said streams (multiple signal samples per symbol period are produced);

(d) estimating channel taps for (each of) said receive (antennas) antenna to produce channel tap estimates;

(e) estimating impairment correlation properties among said multiple receive signal sample streams to produce an estimate of impairment correlation properties;

(f) forming branch metrics in a branch metric processor using said received signal samples, said channel tap estimates, and said estimate of impairment correlation properties; and (g) employing said branch metrics in a sequence estimation algorithm to estimate said transmitted symbol sequence.

20. A method according to claim 19, in which said forming step (f) comprises:

a) generating hypothetical symbol sequences;

b) combining the received signal samples with channel tap estimates and said estimate of impairment correlation properties to produce metric multipliers e(j,n);

c) combining said channel tap estimates with one another and said estimate of impairment correlation properties to produce metric multipliers f(j,n) and g(j,k,n); and d) combining said metric premultipliers with said hypothetical symbol sequences to produce branch metrics.

21. A method according to claim 19, in which said forming step (f) comprises:

a) generating hypothetical symbol sequences;

b) combining the received signal samples with channel tap estimates and said estimate of impairment correlation properties to produce metric multipliers e(j,n);

c) combining said channel tap estimates with one another and said estimate of impairment correlation properties to produce metric multipliers g(j,k,n); and d) combining said metric premultipliers with said hypothetical symbol sequences to produce branch metrics.

22. A method according to claim 19, in which said forming step (f) comprises:

a) generating hypothetical symbol sequences;

b) combining said received signal samples with said channel tap estimates and said estimate of impairment correlation properties to produce Z(n) values;

(b) combining said channel tap estimates with one another and said estimate of impairment correlation properties to produce S(k,n) values; and (c) combining said Z(n) and S(k,n) values with said hypothetical symbol sequences to produce branch metrics.

23. An apparatus for reducing the effects of signal fading, time dispersion, and interference in a radio communications system, comprising:

a digital transmitter for generating and transmitting a signal representing a transmitted symbol sequence;

a receiver for receiving said signal on one receive antenna;

an analog to digital converter for converting said signal into a plurality received signal sample(s) streams for said receive antenna such that there is one signal sample per symbol period in each of said streams (multiple signal samples per symbol are produced);

a channel tap estimator for estimating channel taps for (each of) said receive antenna(s) to produce channel tap estimates;

an impairment correlation estimator for estimating impairment correlation properties among the receive signal sample streams to produce an estimate of impairment correlation properties;

a branch metric processor for forming branch metrics using said received signal samples, said channel tap estimates, and said estimate of impairment correlation properties; and a sequence estimation processor employing said branch metrics to estimate said transmitted symbol sequence.

24. The apparatus of claim 23, in which said branch metric processor comprises:

a symbol sequence generator for generating hypothetical symbol sequences;

means for combining the received signal samples with the channel tap estimates and said estimate of impairment correlation properties to produce metric multipliers e(j,n) and for combining said channel tap estimates with one another and said estimate of impairment correlation properties to produce metric multipliers f(j,n) and g(j,k,n); and for combining said metric multipliers with said hypothetical symbol sequences to produce branch metrics.

25. The apparatus of claim 23, in which said branch metric processor comprises:

a symbol sequence generator for generating hypothetical symbol sequences;

means for combining said received signal samples with said channel tap estimates and said estimate of impairment correlation properties to produce Z(n) values and combining said channel tap estimates with one another and said estimate of impairment correlation properties to produce S(k,n) values and for combining said Z(n) and S(k,n) values with said hypothetical symbol sequences to produce branch metrics.

* * * * *